United States Patent
Takeichi et al.

[15] 3,684,211
[45] Aug. 15, 1972

[54] CARTRIDGE FOR A MOTION PICTURE PROJECTOR

[72] Inventors: Morio Takeichi, Inazawa; Kazuhiko Ogura, Nagoya, both of Japan

[73] Assignee: Elmo Company Limited, Nagoya, Aichi Prefecture, Japan

[22] Filed: Nov. 15, 1971

[21] Appl. No.: 198,605

Related U.S. Application Data

[62] Division of Ser. No. 78,459, Oct. 6, 1970.

[30] Foreign Application Priority Data

Oct. 22, 1969 Japan..................44/83880

[52] U.S. Cl....................242/199, 226/92, 274/4 C, 352/158
[51] Int. Cl......G03b 1/04, G11b 15/32, G11b 23/04
[58] Field of Search.................242/197–200, 203; 352/72, 78, 157, 158; 274/4 B, 4 C, 11 B, 11 C; 226/91, 92; 95/31–34

[56] References Cited

UNITED STATES PATENTS

| | | |
|---|---|---|
| 3,443,501 | 5/1969 | Domnick...................95/31 |
| 3,493,193 | 2/1970 | Crandell et al............242/203 |
| 3,506,346 | 4/1970 | Kato.........................352/72 |

*Primary Examiner*—Leonard D. Christian
*Attorney*—E. F. Wenderoth et al.

[57] ABSTRACT

A film cartridge has a film supply reel on which a roll of film can be wound with its trailing end secured thereto, a housing in which the supply reel is rotatably positioned, and a film take-up core to which a leading end of the film roll can be secured, the take-up core being detachably connected with the housing. The take-up core is disengaged from the housing so that the takeup core together with the leading end of the film can pass through a predetermined path including a film gate in a projector or the like until the core reaches a position where it can be rotated by a driving means for film winding.

2 Claims, 4 Drawing Figures

PATENTED AUG 15 1972 3,684,211
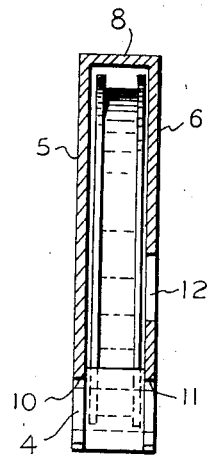
FIG.2
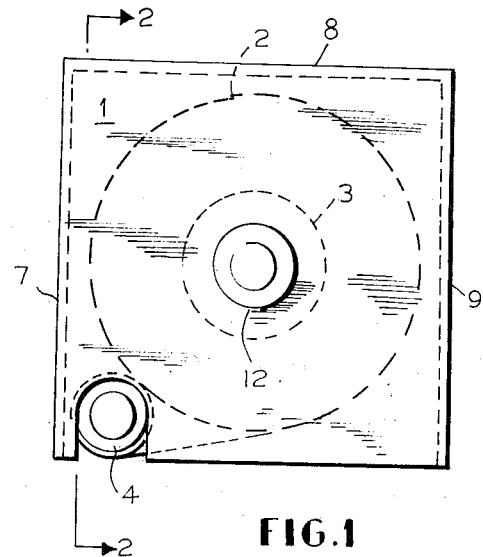
FIG.1
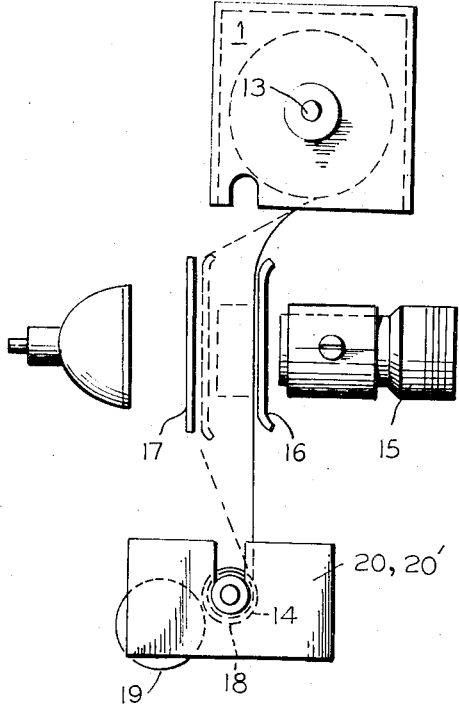
FIG.4
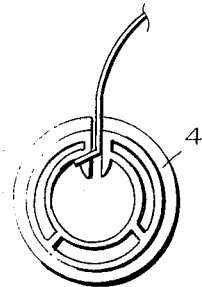
FIG.3
INVENTORS
MORIO TAKEICHI
KAZUHIKO OGURA
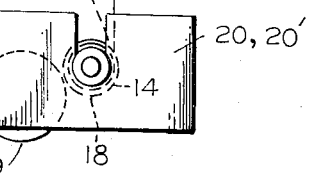
ATTORNEY

CARTRIDGE FOR A MOTION PICTURE PROJECTOR

This application is a divisional of application Ser. No. 78,459, filed Oct. 6, 1970.

BACKGROUND OF THE INVENTION

This invention relates to a film cartridge, and particularly to a film cartridge for a motion picture projector.

Heretofore, various attempts have been made to employ a cartridge in which a film to be projected is contained, in order to simplify operations needed for the projection of the film and to make possible convenient storage of the film, and actually some type of motion picture projectors and cartridges therefor have been commercially produced.

For example, a so-called endless loop film cartridge containing therein an endless film is known. The cartridge of the type described above is advantageously characterized by the fact that there is no need to rewind the film in effecting the projection. However, it requires a special technique and additional time to form a length of a film with leading and trailing ends connected together into a roll of film and to accommodate this film roll in the cartridge. Because of the necessity for such preparatory operations, this type of cartridge has limited uses and is usually used only in the field of movies for educational training.

Another type of a projection system employs a cartridge comprising a film take-up hub having the leading end of a film secured thereto, a film supply hub having the trailing end of the film secured thereto and positioned a predetermined distance from the film take-up hub, and a notch or an opening is provided between the take-up and supply hubs, which notch or opening allows a part of illuminating optical system to act on the film in the notch or opening. With such type of cartridge, it is easy to accommodate the film and there is an advantage that the film roll wound on a film reel can be contained in the cartridge just as it is, as the case may be depending upon the construction of the cartridge. However, with the cartridge of this type, since the positions of and the distance between the film supply and take-up hubs remain unchanged, an inevitable consequence is that the length of the film run in the projector is fixed. In addition, the light emanating from the illuminating optical system employed in the projector can not directly impinge upon the back of the film, i.e., illumination by direct light can not be carried out, resulting in the disadvantage that the projection is inevitably carried out at a reduced illuminating efficiency.

In order to overcome these disadvantages of the first and second types of cartridge, a third type of projection system employing a cartridge capable of containing a roll of film wound on an ordinary film reel has been proposed. With this cartridge, after installing it in the projection therefor, the film roll is driven or rotated by a driving member such as an endless belt or a friction roller while at the same time the outermost peripheral portion of the film roll is engaged by a spatula-shaped tip of a film taking-out member, thereby causing the leading end of the film to be taken out of the cartridge and guided to an entrance to a film track in the projector.

In this third type of cartridge, installation of the film in the cartridge is easy and it is possible to illuminate the film directly. However, a special arrangement is required to take the film out of the cartridge and, in addition, it is required to carry out a troublesome operation of, after installing the film in the projector retracting the film taking-out member from engagement with the film. Further, due to the direct engagement of the film taking-out member with the surface of the film, the leading end portion of the film is apt to be damaged by friction. Therefore, it is necessary to provide the leading end portion with a leader belt of a suitable rigidity and a sufficient length to prevent the film or the pictures on the film from being damaged. However, there is still a disadvantage that because the leader belt itself has a tendency to curve the leading end of the film is not always correctly taken out of the cartridge. Thus, the third type of cartridge lacks reliability.

SUMMARY OF THE INVENTION

It is therefore an object of the invention to provide a new cartridge, which does not possess any of the aforementioned disadvantages of the cartridge known in the prior art and which can effect a reliable film threading.

The above object of the invention can be attained by a film cartridge of the type comprising a film supply reel means, a housing containing said film supply reel means, and a film take-up core means detachably associated with said housing, characterized in that said housing is provided at least in one side thereof with a notch in which said take-up core means can be detachably mounted, and that said supply reel means is adapted to be supported in the housing by said take-up core means in said notch so that a hole in said supply reel means is substantially in alignment with an opening in the same side of the housing as said notch. When using such a cartridge, film threading can be accomplished by a method comprising mounting the cartridge containing the film roll wound on the film supply reel means in the projector, disengaging the film take-up core means from the housing, and moving the film take-up core means through the film path including the film gate of the projector together with the leading end of the film, then to a position where the take-up core means engages a driving means for film winding.

BRIEF DESCRIPTION OF THE DRAWINGS

Further objects and advantages of the invention will be more apparent from the following detailed description taken in conjunction with the accompanying drawing in which:

FIG. 1 is a front elevation view of the cartridge according to the invention;

FIG. 2 is a sectional view taken on line 2—2 of FIG. 1, looking in the direction indicated by the arrows;

FIG. 3 is a view illustrating one method for securing the leading end or the trailing end of a film to the core on which a length of film is wound; and FIG. 4 is a view illustrating the method of threading a length of film in a motion picture projector using the cartridge of the invention.

DESCRIPTION OF THE PREFERRED EMBODIMENT

Referring now to FIG. 1 of the drawings, a film cartridge according to the invention comprises support means in the form of a housing 1, a supply reel 2 on which a roll of film is wound with its trailing end and secured to the core 3 thereof and a film take-up core 4 to which the leading end of the film can be secured. Preferably, the housing 1 of the cartridge is moulded from suitable synthetic resin having some elasticity.

As shown in FIG. 2, the housing 1 has opposed rear and front walls 5 and 6 spaced a predetermined distance apart such that the supply reel 2 is free to rotate between them, and side walls 7, 8 and 9 perpendicular to the walls 5 and 6. These walls 5, 6, 7, 8 and 9 form a box-like member with one open side. The said walls 5 and 6 along the open side are provided with notches 10 and 11 into which is fitted the take-up core 4 with the leading end of the film secured thereto. The take-up core 4 is normally retained in the cartridge by the engagement with the notches 10 and 11 and by the elasticity of the housing 1 and thus, it is prevented from being disengaged from the cartridge. In at least one of the said walls 5 and 6, there is provided an opening 12. The location of the opening 12 is such that with the reel 2 in the housing and take-up core 4 in notches 10 and 11, the center hole in reel 2 is in alignment with the opening 12. The take-up core 4 is positioned in notches 11 and 12 holds supply reel 2 against falling out of housing 1.

The leading end and trailing end of the film can be secured respectively to the take-up core 4 and the core 3 of the reel 2 in a suitable conventional manner such as shown in FIG. 3, wherein the leading end of the film is fixedly connected to the take-up core 4 by a clawed protrusion.

A method of threading the film through a film path of the projector of the type employing the cartridge shown in FIG. 1 and 2 will be described in conjunction with FIG. 4.

First, the cartridge housing 1 having the supply reel 2 and the take-up core 4 assembled therewith is positioned in place in the projector. The projector is provided with a pair of film supply and take-up spindles 13 and 14 spaced a predetermined distance apart and each spindle having a shape such that it can fit into the corresponding supply reel core 3 and take-up core 4 in the cartridge housing 1. Once the film supply spindle is inserted into the supply reel 2 through aperture 12 in wall 6, the supply reel 2 will not fall out of housing 1 even through the take-up core 4 is removed from notches 10 and 11. The projector further comprises a projection lens 15, a pressure plate 16 and an aperture plate 17. In FIG. 4, the projection lens 15 and the pressure plate 16 are moved to forwardly projecting positions by a suitable mechanism at least a distance sufficient to allow the take-up core 4 to be transferred downwardly through the space between the pressure plate 16 and the aperture plate 17 until it reaches the position of the take-up spindle 14. A friction roller member 18 integrally mounted on the take-up spindle 14 is driven by a mating friction roller member 19 which is, in turn, driven by a driving system for the projector.

After the completion of such passage of the leading and of the film through the space between the pressure plate 16 and the aperture plate 17, the projection lens 15 and the pressure plate 16 are move leftwards to close a film gate and reach a normal projection position shown by the dotted lines in FIG. 4.

It is desirable to keep the distance the projection lens 15 moves as small as possible and for this purpose, the cartridge shown in FIG. 1 and 2 is effective, and the spacing required between the pressure plate 16 and the aperture plate 17 to pass the take-up core 4 can be kept very small. In this arrangement, only the take-up core 4 passes through the space between the pressure plate 16 and the aperture plate 17, with the result that the projection lens 15 is required to move only a short distance. The projector is preferably provided with a pair of parallel guide plates 20 and 20' which serve to restrict a lateral movement of the film being wound on the take-up core 4 within the space therebetween, whereby even though the film roll wound on the take-up core 4 increases in diameter it can be prevented from getting loose.

In the operation of threading the film into the projector, since the leading end of the film is guided along the film track together with the rigid take-up core 4 to which said leading end is secured, a reliable operation can be assured both in taking the film out of the cartridge and guiding it to the entrance of the film track.

When employing the cartridge illustrated in FIGS. 1, 2 and 4, the take-up core 4 is the only part moved. Thus only a small movement of the projection lens holder is required to permit the passage of the take-up core 4.

From the foregoing, it will be readily understood that, according to the invention, the cartridge includes the film supply reel rotatably positioned in stationary support means, and the film take-up core engageable with the support means when the cartridge is not in use, and when threading the film, movable from the said support means to the take-up spindly of the projector, so that the cartridge can be handled as a single article and when loading the projector with such a cartridge, a reliable film threading operation can be effected.

We claim:

1. A film cartridge, especially for use with a film projector, comprising a film supply reel means, a housing in which said film supply reel means is rotatably positioned, and a film take-up core means detachably associated with said housing, said housing having at least one side thereof open and at least one notch in the housing adjacent said one side in which said take-up core means is detachably mounted in a position across said open side for supporting said supply reel means in said housing, said housing having an opening therein, the spindle hole is said supply reel means being substantially in alignment with said opening in said housing when said supply reel means is supported in said housing by said take-up core means.

2. A film cartridge according to claim 1 in which said housing is of synthetic resin and has a pair of opposed front and rear walls, and three side walls perpendicular to and joining said end walls to define a box-like shape having one side open, there being two notches, one in each of said front and rear walls along said open side.

* * * * *